(12) United States Patent  
Nishijima et al.

(10) Patent No.: US 9,293,234 B2  
(45) Date of Patent: *Mar. 22, 2016

(54) POSITIVE ELECTRODE ACTIVE MATERIAL, POSITIVE ELECTRODE, AND NONAQUEOUS-ELECTROLYTE SECONDARY BATTERY

(75) Inventors: Motoaki Nishijima, Osaka (JP); Koji Ohira, Osaka (JP); Toshitsugu Sueki, Osaka (JP); Shougo Esaki, Osaka (JP); Isao Tanaka, Kyoto (JP); Yukinori Koyama, Kyoto (JP); Katsuhisa Tanaka, Kyoto (JP); Koji Fujita, Kyoto (JP); Shunsuke Murai, Kyoto (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 388 days.

This patent is subject to a terminal disclaimer.

(21) Appl. No.: 13/809,551
(22) PCT Filed: Jun. 16, 2011
(86) PCT No.: PCT/JP2011/063809
  § 371 (c)(1),
  (2), (4) Date: Jan. 10, 2013
(87) PCT Pub. No.: WO2012/008265
  PCT Pub. Date: Jan. 19, 2012
(65) Prior Publication Data
  US 2013/0115514 A1 May 9, 2013
(30) Foreign Application Priority Data
  Jul. 12, 2010 (JP) .................... 2010-157673
(51) Int. Cl.
  H01B 1/08 (2006.01)
  H01M 4/00 (2006.01)
  (Continued)
(52) U.S. Cl.
  CPC H01B 1/08 (2013.01); C01B 25/45 (2013.01); C01B 33/20 (2013.01); H01M 4/131 (2013.01);
  (Continued)
(58) Field of Classification Search
  CPC .......... H01B 1/08; H01M 4/45; H01M 4/521; H01M 4/523; H01M 4/525; H01M 4/131; H01M 10/052
  See application file for complete search history.

(56) References Cited

U.S. PATENT DOCUMENTS

| 6,085,015 A | 7/2000 | Armand et al. |
| 6,136,472 A | 10/2000 | Barker et al. |

(Continued)

FOREIGN PATENT DOCUMENTS

| CA | 2 271 354 A1 | 11/2000 |
| CA | 2 746 965 | 12/2009 |

(Continued)

OTHER PUBLICATIONS

International Search Report for PCT/JP2011/063809 mailed Aug. 23, 2011.

(Continued)

*Primary Examiner* — Mark Kopec  
(74) *Attorney, Agent, or Firm* — Nixon & Vanderhye P.C.

(57) ABSTRACT

Provided is a positive electrode active material giving non-aqueous-electrolyte secondary batteries superior in cycle characteristics. The positive electrode active material according to the present invention includes a lithium-containing composite metal oxide having the composition represented by the following General Formula (1):

$$Li_zFe_{1-x}M_xP_{1-y}Si_yO_4 \qquad (1)$$

(wherein M is at least one metal element selected from Zr, Sn, Y, and Al, $0.05<x<1$, and $0.05<y<1$), characterized in that: the positive electrode active material is in the single crystalline phase of the lithium-containing composite oxide represented by General Formula (1) when $1>z>0.9$ to 0.75 or 0.25 to $0.1>z>0$;

the positive electrode active material has two crystalline phases of the lithium-containing composite oxides represented by the following General Formulae (2) and (3) when 0.9 to $0.75>z>0.25$ to 0.1:

$$Li_aFe_{1-x}M_xP_{1-y}Si_yO_4 \qquad (2)$$

(wherein $0.75$ to $0.9 \le a \le 1.00$, $0.05<x<1$, and $0.05<y<1$); and $$Li_bFe_{1-x}M_xP_{1-y}Si_yO_4 \qquad (3)$$

(wherein, $0 \le b \le 0.1$ to $0.25+x$, $0.05<x<1$, and $0.05<y<1$), and when the product of the lengths of the b and c axes of the unit cell of the lithium-containing composite oxide of General Formula (2) is designated as bc1 and the product of the lengths of the b and c axes of the unit cell of the lithium-containing composite oxide of General Formula (3) as bc2, α, which is defined by equation $\alpha=(bc2)/(bc1)$, is $0.99<\alpha<1.01$.

6 Claims, 2 Drawing Sheets

(51) Int. Cl.
  *C01B 25/45* (2006.01)
  *C01B 33/20* (2006.01)
  *H01M 4/485* (2010.01)
  *H01M 4/58* (2010.01)
  *H01M 4/136* (2010.01)
  *H01M 4/36* (2006.01)
  *H01M 4/131* (2010.01)
  *H01M 4/525* (2010.01)
  *H01M 4/62* (2006.01)

(52) U.S. Cl.
  CPC .............. *H01M 4/136* (2013.01); *H01M 4/364* (2013.01); *H01M 4/485* (2013.01); *H01M 4/525* (2013.01); *H01M 4/5825* (2013.01); *H01M 4/625* (2013.01); *Y02E 60/122* (2013.01)

(56) References Cited

U.S. PATENT DOCUMENTS

| | | | |
|---|---|---|---|
| 6,528,033 | B1 | 3/2003 | Barker et al. |
| 6,815,122 | B2 | 11/2004 | Barker et al. |
| 8,609,280 | B2 * | 12/2013 | Ohira et al. ............... 429/218.1 |
| 8,999,576 | B2 * | 4/2015 | Ohira et al. ............... 429/218.1 |
| 2001/0055718 | A1 | 12/2001 | Li et al. |
| 2002/0195591 | A1 | 12/2002 | Ravet et al. |
| 2003/0054253 | A1 | 3/2003 | Morishima et al. |
| 2003/0170542 | A1 | 9/2003 | Barker et al. |
| 2003/0190527 | A1 | 10/2003 | Pugh et al. |
| 2003/0215715 | A1 | 11/2003 | Barker et al. |
| 2004/0086445 | A1 | 5/2004 | Armand et al. |
| 2004/0131939 | A1 | 7/2004 | Adamson et al. |
| 2004/0214084 | A1 | 10/2004 | Barker et al. |
| 2005/0058905 | A1 | 3/2005 | Barker et al. |
| 2005/0181283 | A1 | 8/2005 | Pugh et al. |
| 2005/0266316 | A1 | 12/2005 | Kitao et al. |
| 2006/0014079 | A1 | 1/2006 | Chang et al. |
| 2006/0246351 | A1 | 11/2006 | Barker et al. |
| 2006/0292444 | A1 | 12/2006 | Chiang et al. |
| 2008/0160407 | A1 | 7/2008 | Ishii et al. |
| 2008/0261113 | A1 | 10/2008 | Huang et al. |
| 2010/0124703 | A1 | 5/2010 | Ohira et al. |
| 2010/0140540 | A1 | 6/2010 | Yamada et al. |
| 2010/0330426 | A1 | 12/2010 | Adamson et al. |
| 2011/0064980 | A1 | 3/2011 | Ohira et al. |
| 2012/0003537 | A1 | 1/2012 | Ohira et al. |
| 2012/0070708 | A1 | 3/2012 | Ohira et al. |
| 2013/0115514 | A1 | 5/2013 | Nishijima et al. |
| 2013/0209886 | A1 | 8/2013 | Ohira et al. |
| 2014/0178765 | A1 | 6/2014 | Ohira et al. |
| 2015/0104709 | A1 | 4/2015 | Ohira et al. |
| 2015/0104710 | A1 | 4/2015 | Ohira et al. |
| 2015/0171429 | A1 | 6/2015 | Ohira et al. |

FOREIGN PATENT DOCUMENTS

| | | |
|---|---|---|
| CN | 187033 A | 9/2006 |
| CN | 1837033 A | 9/2006 |
| CN | 101364643 | 2/2009 |
| DE | 600 13 909 T2 | 9/2005 |
| DE | 600 37 609 T2 | 1/2009 |
| JP | 2001-307726 | 11/2001 |
| JP | 2001-307731 | 11/2001 |
| JP | 2002-198050 | 7/2002 |
| JP | 2002-519836 | 7/2002 |
| JP | 2004-178835 | 6/2004 |
| JP | 2005-519451 | 6/2005 |
| JP | 2005-522009 A | 7/2005 |
| JP | 2005-340056 | 12/2005 |
| JP | 2006-511038 | 3/2006 |
| JP | 2008-506243 A | 2/2008 |
| JP | 2008-166207 | 7/2008 |
| JP | 2009-104794 | 5/2009 |
| JP | 2009-170401 | 7/2009 |
| JP | 2010-123341 A | 6/2010 |
| JP | 2011-77030 | 4/2011 |
| WO | WO 97/40541 A1 | 10/1997 |
| WO | WO 00/01024 | 1/2000 |
| WO | WO 03/077335 | 9/2003 |
| WO | WO 2004/057691 | 7/2004 |
| WO | WO 2008/039170 | 4/2008 |
| WO | WO 2008/123311 | 10/2008 |
| WO | WO 2010/134579 | 11/2010 |

OTHER PUBLICATIONS

Written Opinion of the International Searching Authority mailed Aug. 23, 2011.
G. Chen et al., "Electron Microscopy Study of the LiFePO$_4$ Phase Transition", Electrochemical and Solid-State Letters, 9 (6), pp. A295-A298 (2006).
Advisory Action issued in U.S. Appl. No. 13/321,717 dated Nov. 6, 2014.
Chen et al., "Electron Microscopy Study of the LiFePO4 Phase Transition", Electrochemical and Solid-State Letters, 9 (6), pp. A295-A298 (2006).
Gregory et al., "Experimental cross sections for electron-impact ionization of iron ions: Fe5+, Fe6+, and FE9+," Physical Review A, Nov. 1986, vol. 34, No. 5, pp. 3657-3667, published by The American Physical Society.
International Search Report issued in PCT/JP2010/058559 dated Aug. 10, 2010.
International Search Report issued in PCT/JP2011/064694 dated Sep. 20, 2011.
Notice of Allowance issued in U.S. Appl. No. 13/321,717 dated Dec. 10, 2014.
Notice of Allowance issued in U.S. Appl. No. 13/807,967 dated Dec. 8, 2014.
Office Action issued in U.S. Appl. No. 13/321,717 dated Aug. 8, 2014.
Office Action issued in U.S. Appl. No. 13/321,717 dated Mar. 24, 2014.
Office Action issued in U.S. Appl. No. 13/427,416 dated Oct. 23, 2014.
Office Action issued in U.S. Appl. No. 14/628,715 dated Jun. 5, 2015.
Office Action mailed Aug. 7, 2014 in U.S. Appl. No. 13/807,967.
Office Action mailed Mar. 14, 2014 in U.S. Appl. No. 13/807,967.
Padhi et al., Phospho-olivines as Positive-Electrode Materials for Rechargeable Lithium Batteries, J. Electrochem. Soc. 144(4), (Apr. 1997).
Recham et al. Chem. Mater. 2008, 20, 6798-6809.
U.S. Appl. No. 13/807,967, filed Feb. 15, 2013 in the name of Ohira et al.
Yanwen et al, "Research on Cathode Material of Li-ion Battery by Yttrium Doping", Science Direct, Journal of Rare Earths, vol. 26, No. 2, Apr. 2008, pp. 279-283.
Delmas et al., "Lithium deintercalation in LiFePO$_4$ nanoparticles via a domino-cascade model," *Nature Materials*, Aug. 2008, vol. 7, pp. 665-671.
Omenya et al., "The Structural and Electrochemical Impact of Li and Fe Site Substitution in LiFePO$_4$," *Chemistry of Materials*, 2013, vol. 25, pp. 2691-2699.
Omenya et al., "Why Substitution Enhances the Reactivity of LiFePO$_4$," *Chemistry of Materials*, 2013, vol. 25, pp. 85-89.
Wang et al, "A Study on LiFePO$_4$and its Doped Derivatives as Cathode Materials for Lithium-Ion Batteries", Journal of Power Sources 159 (2006, pp. 282-286.
Office Action issued in U.S. Appl. No. 14/575,082 dated Aug. 28, 2015.
Office Action issued in U.S. Appl. No. 14/080,474 dated Oct. 27, 2015.
Office Action issued in U.S. Appl. No. 14/575,194 dated Jan. 4, 2016.

* cited by examiner

POSITIVE ELECTRODE ACTIVE MATERIAL, POSITIVE ELECTRODE, AND NONAQUEOUS-ELECTROLYTE SECONDARY BATTERY

This application is the U.S. national phase of International Application No. PCT/JP2011/063809 filed 16 Jun. 2011 which designated the U.S. and claims priority to JP 2010-157673 filed 12 Jul. 2010, the entire contents of each of which are hereby incorporated by reference.

TECHNICAL FIELD

The present invention relates to a positive electrode active material, a positive electrode and a nonaqueous-electrolyte secondary battery, more specifically to a positive electrode active material giving a nonaqueous-electrolyte secondary battery superior in cycle characteristics and a positive electrode and a nonaqueous-electrolyte secondary battery using the same.

BACKGROUND ART

Lithium secondary batteries have been commercialized and used widely as nonaqueous-electrolyte secondary batteries. Furthermore, lithium secondary batteries are recently attracting attention not only as small batteries for portable electronic devices, but also as batteries for larger-capacity devices such as those in automobiles and for power storage. Thus, the requirements for the batteries, for example in stability, cost, and lifetime, are becoming higher.

The main components of a lithium secondary battery are a positive electrode, a negative electrode, an electrolyte solution, a separator, and an outer casing. The positive electrode constituted by a positive electrode active material, a conductive material, a current collector, and a binder (binding agents).

Generally, the positive electrode active material used is a layered transition metal oxide such as $LiCoO_2$. However, the layered transition metal oxide easily loses its oxygen in the full-charge state, even at a relatively low temperature of around 150° C., and the oxygen removal may possibly lead to thermal runaway reaction of the battery. Thus when a battery containing such a positive electrode active material is used for portable electronic devices, it may result in heat development of the battery and also cause troubles such as firing.

Thus, there is high anticipation for lithium-containing composite oxides, such as lithium iron phosphate ($LiFePO_4$) having an olivine structure, that have a stable structure and do not release oxygen under abnormal conditions, and are less expensive than $LiCoO_2$. Lithium intercalation/deintercalation reaction proceeds in $LiFePO_4$ in so-called a two-phase reaction, and the volume change rate is higher at about 7% between in the lithium-intercalated phase and in the lithium-deintercalated phase. During the two-phase reaction in the lithium-intercalated and deintercalated phases, the plane (bc1) (2 in FIG. 1) defined by the b axis and the c axis of the lithium-intercalated phase of $LiFePO_4$ shown as 1 in FIG. 1 and the plane (bc2) (4 in FIG. 1) defined by the b axis and the c axis of the lithium-deintercalated phase shown as 3 in FIG. 1 forms an interface, and the interface moves by intercalation and deintercalation of lithium. Because the area bc1 in the lithium-intercalated phase is larger by 1.7% than that of bc2, such a device is known to be deformed and have for example cracks along the bc plane during repeated charging and discharging, leading to deterioration of the capacity (e.g., Non-patent Literature 1). The deterioration of capacity is the decrease of capacity over time by repeated charge/discharge cycles.

Various proposals were made to overcome the problem of the deterioration in capacity. For example, Patent Document 1 proposes prevention of the deterioration of capacity by adding $Al_2O_3$, which does not contribute to charging and discharging, to the positive electrode. Alternatively, Patent Document 2 proposes prevention of the deterioration of capacity by increasing the dispersibility of the positive electrode active material by adding an inorganic material that does not contribute to charging and discharging of the positive electrode.

CITATION LIST

Patent Document

Patent Document 1: JP-A-No. 2005-340056
Patent Document 2: JP-A-No. 2008-166207

Nonpatent Document

Nonpatent Document 1: Guoying Chen, Xiangyun Song, and Thomas J. Richardson, J. Electrochemical and Solid-State Letters, 9 (6) A295-A298 (2006)

SUMMARY OF INVENTION

Technical Problem

However, there existed a problem in the method of Patent Document 1 or 2 that it was not possible to sufficiently suppress the deterioration of capacity, i.e., the deterioration of capacity over time by charge/discharge cycle, when lithium iron phosphate was used as the active substance.

Solution to Problem

After intensive studies to solve the problems above, the inventors of the present invention have found that it is possible to suppress deterioration in capacity of a nonaqueous-electrolyte secondary battery, by using a lithium-containing composite oxide having a value $\alpha=(bc2)/(bc1)$, which is defined by the product of the lengths of the b and c axes of the unit cell in the crystalline phase containing much lithium (bc1: area of bc plane) the product of the lengths of the b and c axes of the unit cell in the crystalline phase containing less lithium (bc2: area of bc plane) in the lithium-containing composite oxide for intercalation and deintercalation of lithium, in a predetermined range as the positive electrode active material of the nonaqueous-electrolyte secondary battery, and made the present invention.

Accordingly, the positive electrode active material for nonaqueous-electrolyte secondary batteries according to the present invention is a positive electrode active material for nonaqueous-electrolyte secondary batteries, comprising a lithium-containing composite oxide represented by the following General Formula (1):

$$Li_xFe_{1-x}M_xP_{1-y}Si_yO_4 \tag{1}$$

(wherein M is at least one metal element selected from Zr, Sn, Y, and Al, 0.05<x<1, and 0.05<y<1), characterized in that: the positive electrode active material is in the single crystalline phase of the lithium-containing composite oxide represented by General Formula (1) when 1>z>0.9 to 0.75 or 0.25 to 0.1>z>0;

the positive electrode active material has two crystalline phases of the lithium-containing composite oxides represented by the following General Formulae (2) and (3) when 0.9 to 0.75>z>0.25 to 0.1:

$$Li_aFe_{1-x}M_xP_{1-y}Si_yO_4 \quad (2)$$

(wherein 0.75 to 0.9≤a≤1.00, 0.05<x<1, and 0.05<y<1); and

$$Li_bFe_{1-x}M_xP_{1-y}Si_yO_4 \quad (3)$$

(wherein 0≤b≤0.1 to 0.25+x, 0.05<x<1, and 0.05<y<1), and when the product of the lengths of the b and c axes of the unit cell of the lithium-containing composite oxide of General Formula (2) is designated as bc1 and the product of the lengths of the b and c axes of the unit cell of the lithium-containing composite oxide of General Formula (3) as bc2, a, which is defined by the equation α=(bc2)/(bc1), is 0.99<α<1.01.

In addition, the positive electrode for nonaqueous electrolytes according to the present invention is characterized by containing the positive electrode active material above, a conductor, and a binder.

The nonaqueous-electrolyte secondary battery according to the present invention is also characterized by containing a positive electrode containing the positive electrode active material, a negative electrode, an electrolyte, and a separator.

Advantageous Effects of Invention

Because the ratio α of the areas of the bc planes, which are obtained by mutually multiplying the lengths of the b and c axes of the unit cells of the phases in the region where two crystalline phases are copresent, is in the range of 0.99<α<1.01, the positive electrode active material according to the present invention is resistant to the deterioration of capacity over time during repeated charge/discharge cycles.

DESCRIPTION OF EMBODIMENTS

Figure 1:
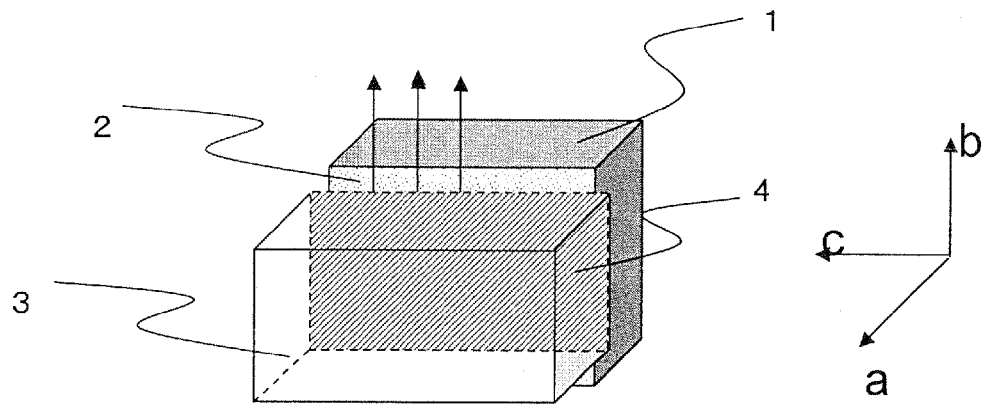
FIG. 1 is a schematic view illustrating the two-phase reaction of lithium iron phosphate.

Hereinafter, the present invention will be described in detail.
(I) Positive Electrode Active Material The positive electrode active material for use in the present invention is a lithium-containing composite metal oxide represented by the following General Formula (1):

$$Li_zFe_{1-x}M_xP_{1-y}Si_yO_4 \quad (1)$$

(wherein M is at least one metal selected from Zr, Sn, Y and Al, 0.05<x<1, and 0.05<y<1).

In General Formula (1), M is at least one metal element selected from Sn, Zr, Y, and Al. The valency of M is not particularly limited. Y and Al are trivalent; Sn may be bivalent or tetravalent; Zr may be bivalent to tetravalent. Fe may be bivalent to tetravalent or hexavalent. As for Sn, Zr, and Fe, metal elements having the same valency may be used or a mixture of the metal elements with different valencies may be use. In the case of Sn and Zr among the valences above, tetravalent metals may be used, because the valency changes less significantly in preparation of the lithium-containing composite metal oxide and also during charging and discharging. Y and Al are present only as trivalent and it is possible to suppress the change in valency by using these metals during production of the lithium-containing composite metal oxide and during charging and discharging. As for Fe, bivalent Fe is preferably used for improvement of the intercalation/deintercalation efficiency of Li. When a mixture is used, the valency specifying x in General Formula (1) means the average for convenience.

In the present invention, the lithium-containing composite metal oxide in the olivine-type structure or in any other structure may be used, if it is a lithium-containing composite metal oxide represented by General Formula (1).

For reduction of the ratio of the areas of bc planes, M is preferably a trivalent or tetravalent metal element, more preferably a tetravalent metal element, still more preferably Zr.

In General Formula (1), 0.05<x<1 and 0.05<y<1. In order to reduce the volume change rate of the lithium-containing composite metal oxide associated with intercalation and deintercalation of lithium, preferably 0.05≤x≤0.25 and/or 0.10≤y≤0.50, more preferably 0.075≤x≤0.25 and/or 0.15≤y≤0.5. When x is large (i.e., when the rate of M substituting Fe is larger) and/or y is large (i.e., when the rate of Si substituting P is larger), it often results in decrease of volume change rate and also decrease of discharge capacity. Accordingly, it is possible to determine the values of x and y according to the metal M selected, so as to increase the discharge capacity, while satisfying the requirement of a.

In the present invention, when 1>z>0.9 to 0.75 and 0.25 to 0.1>z>0, the compound of General Formula (1) is in a single crystalline phase. Alternatively when 0.9 to 0.75>z>0.25 to 0.1, the charge and discharge reaction progresses in the copresence of the two phases shown by the General Formulae (2) and (3) below.

In the copresence of two phases, the lithium-containing composite metal oxide in the crystalline phase containing much lithium is represented by the following General Formula (2):

$$Li_aFe_{1-x}M_xP_{1-y}Si_yO_4 \quad (2)$$

wherein 0.75 to 0.9≤a≤1.00, 0.05<x<1, and 0.05<y<1. Preferably, 0.9≤a≤1.00.

Alternatively, the lithium-containing composite metal oxide in the crystalline phase containing less lithium is represented by the following General Formula (3):

$$Li_bFe_{1-x}M_xP_{1-y}Si_yO_4 \quad (3)$$

wherein 0≤b≤0.1 to 0.25+x, 0.05<x<1, and 0.05<y<1. Preferably, 0≤b≤0.1.

When the product of the lengths of the b and c axes of the unit cell of the lithium-containing composite metal oxide of General Formula (2) (area of bc plane) is expressed by bc1 and the product of the lengths of the b and c axes of the unit cell of the lithium-containing composite metal oxide of General Formula (3) (area of bc plane) is expressed by bc2, the ratio α of the areas of bc planes represented by the following Formula 4 is in the range below: 0.99<α<1.01. Preferably, 0.995<α<1.005. The ratio α of the areas of bc planes=(bc2)/(bc1) (4)

In the present invention, the lithium-containing composite metal oxide represented by General Formula (2) will be referred to as LFP phase, while the lithium-containing composite metal oxide represented by General Formula (3) as FP phase.

In the region where lithium-containing composite metal oxides in the LFP phase and the FP phase are copresent, the lattice constants of the unit cells in the LFP and FP phases remain constant. In contrast, in the region where the LFP phase is present alone, i.e., in the region where 1>z>0.9 to 0.75, the lattice constants may change, compared to those in the state when z=1. Similarly in the region where the FP phase is present alone, i.e., in the region where 0.25 to 0.1>z>0, the lattice constants may change according to the value of z.

Also in lithium-containing composite metal oxides of General Formulae (2) and (3), 0.05<x<1 and 0.05<y<1. In the ranges above, it is possible to reduce the volume change that occurs during intercalation and deintercalation of lithium, while preventing large decrease of the discharge capacity as battery. Preferably, $0.05 \le x \le 0.25$ and/or $0.1 \le y \le 0.5$.

In the present invention, when x is larger and/or y is larger, the ratio α of the areas of bc planes becomes closer to 1 and thus, it becomes possible to suppress the distortion at the interface. This improves the capacity preservation rate associated with repeated charging and discharging. Thus, it is possible to obtain a capacity preservation rate of 90% or more by controlling a in the range according to the present invention.

On the other hand, depending on the kind of the substitution metal M, the discharge capacity may decline when x is larger and/or y is larger. For improvement of the discharge capacity, for example, the following measure may be taken.

For example when Fe is substituted by Zr, x is preferably 0.35 or less and/or y is 0.7 or less, to obtain a discharge capacity of 100 mAh/g or more. Alternatively, x is preferably 0.3 or less and/or y is 0.6 or less, in order to obtain a discharge capacity of 110 mAh/g or more. Yet alternatively, x is preferably 0.25 or less and/or y is 0.5 or less, to obtain a discharge capacity of 120 mAh/g or more.

When Fe is substituted by Sn, x is preferably 0.33 or less and/or y is 0.66 or less, in order to obtain a discharge capacity of 100 mAh/g or more. Alternatively, x is preferably 0.29 or less and/or y is 0.58 or less, in order to obtain a discharge capacity of 110 mAh/g or more. Yet alternatively, x is preferably 0.23 or less and/or y is 0.46 or less, in order to obtain a discharge capacity of 120 mAh/g or more.

When Fe is substituted by Y, x is preferably 0.35 or less and/or y is 0.35 or less, in order to obtain a discharge capacity of 100 mAh/g or more. Alternatively, x is preferably 0.35 or less and/or y is 0.35 or less, in order to obtain a discharge capacity of 110 mAh/g or more. Yet alternatively, x is preferably 0.25 or less and/or y is 0.25 or less, in order to obtain a discharge capacity of 120 mAh/g or more.

When Fe is substituted by Al, x is preferably 0.45 or less and/or y is 0.45 or less, in order to obtain a discharge capacity of 100 mAh/g or more. Alternatively, x is preferably 0.4 or less and/or y is 0.4 or less, in order to obtain a discharge capacity of 110 mAh/g or more. Yet alternatively, x is preferably 0.35 or less and/or y is 0.35 or less, in order to obtain a discharge capacity of 120 mAh/g or more.

When Fe is substituted by a trivalent metal atom and Fe is all bivalent, Si is preferably included in the amount identical with that of Fe substituted, for preservation of electrical neutrality. In this case, the substitution amount of Al is preferably 0.35 or more and that of Y is 0.2 or more, in order to make the volume change rate 4% or less.

When Fe is substituted by a tetravalent metal atom and Fe is all bivalent, Si is preferably included in the amount twice as much as that of Fe substituted, for preservation of electrical neutrality. In this case, the substitution amount of Zr is preferably 0.15 or more and that of Sn is 0.25 or more, in order to make the volume change rate 4% or less. Alternatively, the substitution amount of Zr is preferably 0.2 or more and that of Sn is 0.3 or more, in order to make the volume change rate 3% or less. Yet alternatively, the substitution amount of Zr is preferably 0.25 or more, in order to make the volume change rate 2% or less.

The lithium-containing metal oxide for use in the present invention is, for example, a compound represented by the following General Formula:

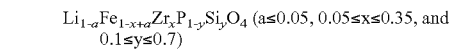
$Li_{1-a}Fe_{1-x+a}Zr_xP_{1-y}Si_yO_4$ (a≤0.05, 0.05≤x≤0.35, and 0.1≤y≤0.7)

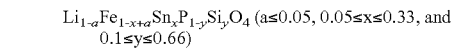
$Li_{1-a}Fe_{1-x+a}Sn_xP_{1-y}Si_yO_4$ (a≤0.05, 0.05≤x≤0.33, and 0.1≤y≤0.66)

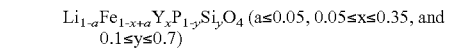
$Li_{1-a}Fe_{1-x+a}Y_xP_{1-y}Si_yO_4$ (a≤0.05, 0.05≤x≤0.35, and 0.1≤y≤0.7)

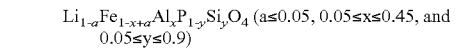
$Li_{1-a}Fe_{1-x+a}Al_xP_{1-y}Si_yO_4$ (a≤0.05, 0.05≤x≤0.45, and 0.05≤y≤0.9)

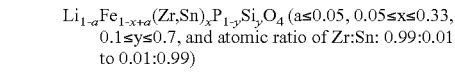
$Li_{1-a}Fe_{1-x+a}(Zr,Sn)_xP_{1-y}Si_yO_4$ (a≤0.05, 0.05≤x≤0.33, 0.1≤y≤0.7, and atomic ratio of Zr:Sn: 0.99:0.01 to 0.01:0.99)

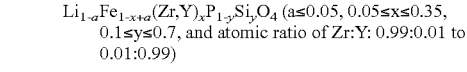
$Li_{1-a}Fe_{1-x+a}(Zr,Y)_xP_{1-y}Si_yO_4$ (a≤0.05, 0.05≤x≤0.35, 0.1≤y≤0.7, and atomic ratio of Zr:Y: 0.99:0.01 to 0.01:0.99)

$Li_{1-a}Fe_{1-x+a}(Zr,Al)_xP_{1-y}Si_yO_4$ (a≤0.05, 0.05≤x≤0.45, 0.05≤y≤0.7, and atomic ratio of Zr:Al: 0.99:0.01 to 0.01:0.99)

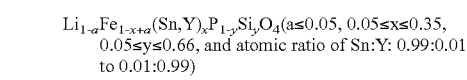
$Li_{1-a}Fe_{1-x+a}(Sn,Y)_xP_{1-y}Si_yO_4$ (a≤0.05, 0.05≤x≤0.35, 0.05≤y≤0.66, and atomic ratio of Sn:Y: 0.99:0.01 to 0.01:0.99)

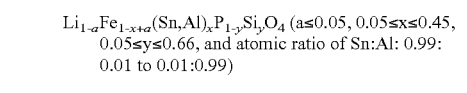
$Li_{1-a}Fe_{1-x+a}(Sn,Al)_xP_{1-y}Si_yO_4$ (a≤0.05, 0.05≤x≤0.45, 0.05≤y≤0.66, and atomic ratio of Sn:Al: 0.99:0.01 to 0.01:0.99)

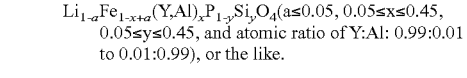
$Li_{1-a}Fe_{1-x+a}(Y,Al)_xP_{1-y}Si_yO_4$ (a≤0.05, 0.05≤x≤0.45, 0.05≤y≤0.45, and atomic ratio of Y:Al: 0.99:0.01 to 0.01:0.99), or the like.

Alternatively when M is tetravalent, x and y preferably have a relationship of 2x=y. Yet alternatively when M is trivalent, x and y preferably have a relationship of x=y. The lithium-containing metal oxide having the relationship has an advantage that the positive electrode active material is more resistant to defect of oxygen and also of elements such as P and Li and has a strengthened crystal structure.

(2) Method of Producing Lithium-Containing Composite Oxide

The present invention relates to a process for producing the lithium-containing composite oxide of General Formula (1), at least including a step of dissolving raw materials in a solvent (hereinafter, referred to as solubilization step), a step of gelating the solution obtained (hereinafter, referred to as gelation step), a step of pulverizing the obtained gel into gel particles having an average diameter of 0.1 to 50 μm (hereinafter, referred to as pulverization step), and a step of calcining the obtained gel (hereinafter, referred to as calcination step). The process includes, additionally as needed, a step of removing the solvent from the gel obtained in the gelation step (hereinafter, referred to as drying step) or a step of mixing the gel particles with a carbon-source substance before calcination (hereinafter, referred to as carbon source-mixing step).

(i) Solubilization Step

The raw materials, a lithium source, an element M source, a phosphorus source, and an element X source, are not particularly limited, if they are soluble in the solvent. These compounds are preferably soluble in an amount of 10 mmol or more in 100 g of the solvent.

(Lithium Source)

The lithium-source substance is not particularly limited, if it can be a raw material for the positive electrode active material of General Formula (1), is soluble in the solvent, and does not inhibit the production process according to the present invention. Inorganic acid salts, hydroxide, organic acid salts, and alkoxides of lithium and the hydrates thereof can be used. Typical examples of the inorganic salts include a salt with a weak acid (hereinafter, referred to as weak acid salt), lithium carbonate ($Li_2CO_3$) and a salt with a strong acid (hereinafter, referred to as strong acid salt), lithium nitrate ($LiNO_3$) and lithium chloride (LiCl). Examples of the organic salts include weak acid salts such as lithium acetate ($LiCH_3COO$) and lithium oxalate $(COOLi)_2$. Examples of the alkoxides include lithium methoxide ($LiOCH_3$), lithium ethoxide ($LiOC_2H_5$), lithium n-propoxide ($LiO-n-C_3H_7$), lithium i-propoxide ($LiO-i-C_3H_7$), lithium n-butoxide ($LiO-n-C_4H_9$), lithium t-butoxide ($LiO-t-C_4H_9$), lithium sec-butoxide ($LiO-sec-C_4H_9$) and the like. The inorganic and organic salts may be the hydrates thereof. Weak and strong acid salts are preferable among them, because they easily give a homogeneous solution under atmosphere and are inexpensive, and lithium acetate or lithium nitrate is preferable among them. The "homogeneous solution," as used in the present invention, is a solution in which there is no precipitation and no separation into two or more phases by visual observation.

Hereinafter, the method of dissolving a lithium source, in the case when the elements M used are iron and zirconium, the element X is silicon, and the solvent is ethanol, will be described. When a weak acid salt anhydride is used as the lithium source, it is preferably dissolved after the hydrate of the iron-source salt or the hydrate of the zirconium-source salt is dissolved, because it is less soluble in ethanol. If it is dissolved before addition of the hydrate of iron-source salt or the hydrate of zirconium-source salt, it is preferably dissolved in water previously. Alternatively, water in an amount making the anhydride of the weak acid salt dissolved may be added to ethanol. The amount of water added for solubilization of the anhydride of weak acid salt is preferably 1 to 100 times as much as the mole number of Li, and more preferably 4 to 20 times.

The anhydride of weak acid salt can be dissolved arbitrarily in combination with an iron source, a zirconium source, or a silicon source in any order, to give a homogeneous solution. Other raw materials may be added after the homogeneous solution obtained is subjected to reaction. The anhydride of weak acid salt is preferably reacted with the hydrate of iron-source salt in advance. Reaction between the anhydride of weak acid salt and the hydrate of iron-source salt in advance can prevent precipitation when phosphoric acid is added.

The anhydride of weak acid salt is also preferably reacted in advance with tetramethoxysilane or tetraethoxysilane, especially with tetramethoxysilane. The procedure of mixing then is preferably to dissolve the anhydride of weak acid salt in water first, add ethanol thereto, and add tetramethoxysilane or tetraethoxysilane. It is possible to accelerate the reaction further by heating the mixture to 30° C. to 60° C. The heating period is not particularly limited, and suitably about 30 minutes to 12 hours. The reaction between the anhydride of weak acid salt and the silicon source in advance makes it possible to prevent generation of impurities after calcination and substitution of Fe to the lithium sites in the lithium composite oxide.

(Element M Source)

The substance as the element M source is not particularly limited, if it can be a raw material for the positive electrode active material of General Formula (1), is soluble in the solvent, and does not inhibit the production process according to the present invention. Inorganic acid salts, hydroxide, organic acid salts, and alkoxides of element M and the hydrates thereof can be used. As described above, M is at least one element selected from the group consisting of Fe, Ni, Mn, Zr, Sn, Al, and Y and preferably contains at least Fe. Example of the iron-source inorganic salts include a weak acid salt iron (II) carbonate ($Fe(CO_3)$), and strong acid salts such as iron (II) nitrate ($Fe(NO_3)_2$), iron (III) nitrate ($Fe(NO_3)_3$), iron (II) chloride ($FeCl_2$), and iron (III) chloride ($FeCl3_3$). Examples of the organic salts include weak acid salts such as iron (II) oxalate ($FeC_2O_4$), iron (III) oxalate ($Fe_2(C_2O_4)_3$), iron (II) acetate ($Fe(CH_3COO)_2$), and iron(III) acetate ($Fe(CH_3COO)_3$). Hydrates of strong acid salts are preferable, and iron(III) nitrate nonahydrate is preferable among them.

Hereinafter, the method of dissolving the element M source when the elements M used are iron and zirconium, the element X used is silicon, and the solvent used is ethanol will be described.

The hydrate of strong acid salt can be dissolved arbitrarily in combination with a lithium source, a zirconium source, or a silicon source in any order, to give a homogeneous solution. Other raw materials may be added after the homogeneous solution obtained is subjected to reaction. The hydrate of strong acid salt is preferably added to the solvent before addition of phosphoric acid. Reaction only of the hydrate of strong acid salt in advance can prevent generation of impurities after calcination and thus, the hydrate of strong acid salt may, after solubilization in ethanol, be heated for reaction in advance to a degree not causing precipitate.

(Zirconium Source)

Examples of the zirconium-source inorganic salts include zirconium halides such as zirconium chloride ($ZrCl_4$), zirconium bromide ($ZrBr_4$), and zirconium iodide ($ZrI_4$), oxyzirconium salts such as zirconium oxychloride ($ZrOCl_2$) and zirconium oxynitrate ($ZrO(NO_3)_2$). Alternatively examples of the metal alkoxides include zirconium methoxide ($Zr(OCH_3)_4$), zirconium ethoxide ($Zr(OC_2H_5)_4$), zirconium n-propoxide ($Zr(O-n-C_3H_7)_4$), zirconium i-propoxide ($Zr(O-i-C_3H_7)_4$), zirconium n-butoxide ($Zr(O-n-C_4H_8)_4$), zirconium t-butoxide ($Zr(O-t-C_4H_8)_4$), zirconium sec-butoxide ($Zr(O-t-C_4H_8)_4$) and the like. Zirconium halides are preferable, and zirconium chloride is particularly preferable among them.

The zirconium halides can be dissolved arbitrarily in combination with a lithium source, an iron source, or a silicon source in any order, to give a homogeneous solution. The zirconium halide is preferably reacted in advance with an iron source of the hydrate of strong acid salt. Reaction between the zirconium halide and an iron source of the hydrate of strong acid salt in advance can prevent formation of impurities such as zirconia and zirconium phosphate after calcination. It is also preferable to make the zirconium halide react in advance with tetramethoxysilane or tetraethoxysilane, especially with tetramethoxysilane. The reaction between the zirconium halide and a silicon source in advance can prevent generation of impurities after calcination and substitution of Fe to the lithium site in the lithium composite oxide.

(Phosphorus Source)

The substance as phosphorus source is not particularly limited, if it can be a raw material for the positive electrode active material of General Formula (1), is soluble in the solvent, and does not inhibit the production process according to the present invention. Typical examples thereof include phosphoric acid ($H_3PO_4$), ammonium hydrogen phosphate $((NH_4)_2HPO_4)$, ammonium dihydrogen phosphate $(NH_4H_2PO_4)$ and the like. Among them, phosphoric acid is preferable.

Hereinafter, the method of dissolving the phosphorus source, when the elements M are iron and zirconium, the element X used is silicon, and the solvent used is ethanol, will be described.

Phosphoric acid should be added at least after the lithium source, the iron source, and the zirconium source are dissolved. It is because addition of phosphoric acid to the anhydride of the weak acid salt of Li and the zirconium halide may lead to precipitation. When phosphoric acid is added, it may be added in excess. Addition of phosphoric acid in excess can prevent generation of impurities after calcination and substitution of Fe to the lithium sites in the lithium composite oxide. When phosphoric acid is added in excess, it can be added in an amount in excess in the range of 5 to 20 wt %, more preferably in the range of 5 to 15 wt % over the stoichiometric ratio of phosphoric acid.

(Element X Source)

The substance of element X source is not particularly limited, if it can be a raw material for the positive electrode active material of General Formula (1), is soluble in the solvent, and does not inhibit the production process according to the present invention. An alkoxide of element X may be used. X is at least one element selected from Si and Al and it is preferably Si. Examples of the silicon sources include various silicon alkoxides such as tetraethoxysilane $(Si(OC_2H_5)_4)$, tetramethoxysilane $(Si(OCH_3)_4)$, methyltriethoxysilane $(CH_3Si(OC_2H_5)_3)$, methyltrimethoxysilane $(CH_3Si(OCH_3)_3)$, ethylmethoxysilane $(C_2H_5Si(OCH_3)_3)$, and ethyltriethoxysilane $(C_2H_5Si(OC_2H_5)_3)$. Tetraethoxysilane or tetramethoxysilane is preferable.

Hereinafter, the method of dissolving the element X source, when the elements M used are iron and zirconium, the element X used is silicon, and the solvent used is ethanol, will be described.

The silicon alkoxide may be added arbitrarily in combination with a lithium source, an iron source, or zirconium source in any order, to give a homogeneous solution. Water may be added for acceleration of the reaction of the silicon alkoxide. The amount of the water added is 1 to 100 times, more preferably 2 to 20 times as much as the mole number of silicon. Addition of water leads to progress of hydrolysis and acceleration of the reaction. The silicon alkoxide may be reacted with phosphoric acid in advance. When tetraethoxysilane is used, the reaction is preferably carried out at 40° C. to 80° C., more preferably at 50° C. to 80° C. When tetramethoxysilane is used, the reaction is preferably carried out at 20° C. to 60° C. When tetramethoxysilane and the anhydride of a lithium-source weak acid salt are reacted, the ratio of (mole number of Li in lithium source/mole number of Si in silicon source) is preferably 2 or more.

The solvent used is at least one alcohol selected from the group consisting of methanol, ethanol, n-propanol, isopropanol, and n-butanol. It is preferably ethanol. The alcohol may be used, as needed, as a solution mixed with water, to make less-soluble raw materials dissolved in alcohol. The amount of the solvent is not particularly limited, if all of the raw materials are dissolved. However, if recovery cost of the solvent is taken into consideration, the amount of the solvent is preferably a molar ratio in the range of 1 to 100 times, more preferably 2 to 15 times as much as the total mole number of all raw materials.

(Solubilization Method)

There may be obtained precipitation and no homogeneous solution, depending on the order of the raw materials dissolved in the solubilization step. Thus, the order of dissolving the raw materials is important.

Hereinafter, the order, when the elements M used are iron and zirconium and the element X used is silicon, will be described. As described above, if phosphoric acid is added to a lithium source of weak acid salt, especially the anhydride of the salt and a zirconium source, there is precipitation, while the zirconium ion is stabilized in the presence of iron ions. Accordingly, the phosphorus source should be dissolved in a solvent containing at least a lithium source, an iron source, and a zirconium source dissolved therein. The silicon source may be dissolved before solubilization of the phosphorus source or after solubilization of the phosphorus source.

The order of dissolving the raw materials, as used in the present invention, is the order of the raw materials added when the raw materials are added to the solvent sequentially, but it is the order of mixing, when a solution containing multiple raw materials dissolved therein is prepared previously and the solution is mixed.

The order of preparing the solution containing the lithium source, the iron source, and the zirconium source dissolved therein is not particularly limited, if zirconium ions are stabilized by iron ions. Examples of the methods of stabilizing zirconium ions with iron ions include a method of dissolving an iron strong acid salt hydrate in a solvent and then dissolving a zirconium halide therein, a method of dissolving a zirconium halide in a solvent and then dissolving an iron strong acid salt hydrate, a method of dissolving an iron strong acid salt hydrate and a zirconium halide in a solvent simultaneously, and the like. The order of solubilizing the iron source and the zirconium-source is not particularly limited, and it may be possible to dissolve one of them first or dissolve both of them at the same time.

When a salt anhydride, for example lithium acetate, is used as the lithium source, it is not dissolved in the solvent, unless water is added to the solvent. Thus when a salt anhydride is used as the lithium source, it is preferable to dissolve first an iron salt hydrate and a zirconium salt hydrate in a solvent and add the lithium salt anhydride to the resulting solution.

When raw materials are dissolved in a solvent, the solution may be heated to a temperature above room temperature. The heating temperature is 30° C. to 80° C., more preferably 30° C. to 60° C.

Although an example when the elements M used are iron and zirconium and the element X used is silicon was described in the description of the solubilization step, the elements M and X are not particularly limited, if they are included in the compounds of General Formula (1) above and permit uniform solubilization of all raw materials in the solvent.

(ii) Gelation Step

In the present step, the solution obtained in the solubilization step is subjected to gelation. The inventors consider that the gelation proceeds, as elements Li, M, P, and X bind to each other via oxygen atoms, forming a number of aggregates, which precipitate as fine particles having a particle diameter of several nm to several tens nm in the gel form, increasing the viscosity of the solution.

According to the gelation method, the solution may be left still or agitated. In addition, the solution may be heated for acceleration of gelation. The heating temperature is in the range from room temperature to the boiling point of the solvent used, preferably 30° C. to 80° C., more preferably 40° C. to 60° C. The heating time is 10 minutes to 48 hours, preferably 30 minutes to 24 hours.

(iii) Drying Step

In the present step, the residual solvent is removed from the gelated gel. Examples of the methods of removing the solvent include a method of leaving the solution at room temperature, a method of removing the solvent by heating the gel at 30 to 80° C., a method of placing the gel in a chamber equipped for example with a rotary pump and removing the solvent under reduced pressure, and the like. Alternatively, the solvent may be removed by the method above, after the gel is solvent-exchanged with a solvent higher in volatility than the solvent used in preparation of the solution or a solvent different in surface tension. Examples of the solvents used in the solvent exchange include toluene, benzene, hexane, tetrahydrofuran, isopropanol, and the mixed solvent thereof. Alternatively, the solvent may be removed from the gel obtained in this step, as the gel is immersed in carbon dioxide in the supercritical state for solvent extraction. These solvents removed are preferably reused as they are recovered from the industrial point of view.

(iv) Pulverization Step

In the present step, the gel obtained is pulverized mechanically. The pulverization method is not particularly limited, and the gel may be, as needed, heated or cooled or left under controlled atmosphere. Examples of the pulverization means include, but are not limited to, planetary ball mills, ball mills, bead mills, vibrating mills, pin mills, atomizers, homogenizers, rotor mills, roller mills, hammer mills, jet mills and the like. The gel after pulverization has an average diameter of 0.1 μm to 50 μm, preferably 0.2 to 10 μm. When the average diameter is more than 50 μm, the reduction during calcination becomes insufficient, resulting in generation of impurities such as $Fe_2O_3$ and $ZrO_2$. Alternatively if the average diameter is less than 0.1 μm, the gel is unpractical, because the gel has larger surface area, reacting with water in air and also easily generating impurities by absorption of carbon dioxide and also because the pulverization demands an extended period of time.

(v) Carbon Source Mixing Step

Saccharides, oils, or synthetic resin materials may be added to the gel pulverized. It is possible by carbonizing these compounds during calcination to form a carbon coating on at least part of the surface of lithium-containing composite oxide particles, thus improving the conductivity of the particles and reducing deterioration of capacity at the first time and also over time by repeated charge/discharge cycles. Sucrose, fructose and the like are preferably used as the saccharides. Examples of the synthetic resin materials used include polyethers such as polyethylene glycol and polypropylene glycol, polyvinylalcohols, polyacrylamides, carboxymethylcellulose, polyvinyl acetates and the like.

(vi) Calcination Step

In the present step, the gel obtained is calcined, to give a lithium-containing composite oxide. The calcination is carried out in the temperature range of 400 to 700° C., preferably 400 to 600° C. over 1 to 24 hours. The atmosphere for use during calcination may be an inert atmosphere (atmosphere of argon, nitrogen, vacuum or the like) or a reductive atmosphere (atmosphere of hydrogen-containing inert gas, carbon monoxide or the like). For uniform calcination, the gel may be agitated. If hazardous gases such as NOx, Sox, and chlorine are generated during calcination, a gas-removing device may be installed.

(vii) Other Step

The lithium-containing composite oxide obtained may be adjusted to a desired particle diameter, as needed, by subjecting it to a pulverization step and/or a classification step.

(3) Applications

The lithium-containing composite oxide obtained can be used as a positive electrode active material in nonaqueous-electrolyte secondary batteries. The positive electrode active material may contain, in addition to the lithium-containing composite oxide above, other oxides such as $LiCoO_2$, $LiNiO_2$, $LiFeO_2$, $LiMnO_2$, $LiMn_2O_4$, $Li_2MnO_3$, $LiCoPO_4$, $LiNiPO_4$, $LiMnPO_4$, and $LiFePO_4$.

A nonaqueous-electrolyte secondary battery has a positive electrode, a negative electrode, and a nonaqueous electrolyte. Hereinafter, the constituent materials will be described.

(a) Positive Electrode

The positive electrode can be prepared by a known method. For example, it is prepared by kneading and dispersing a positive electrode active material, a conductor, and a binder in an organic solvent into a paste and coating the paste on a current collector. When the lithium-containing composite oxide obtained has sufficiently high conductivity, the conductor may not be needed to be added.

Examples of the binders for use include polytetrafluoroethylene, polyvinylidene fluoride, polyvinyl chloride, ethylene propylene diene polymers, styrene-butadiene rubbers, acrylonitrile-butadiene rubbers, fluorine rubbers, polyvinyl acetate, polymethyl methacrylate, polyethylene, nitrocellulose, styrene-butadiene rubbers and the like. A thickener such as carboxymethylcellulose may be used, as needed.

Examples of the conductors for use include acetylene black, natural graphites, man-made graphites, needle cokes and the like.

Examples of the current collectors for use include expanded (porous) metals containing continuous pores, honeycomb-shaped metals, sintered metals, expand metals, nonwoven fabrics, plates, perforated plates, foils and the like.

Examples of the organic solvents for use include N-methyl-2-pyrrolidone, toluene, cyclohexane, dimethylformamide, dimethylacetamide, methylethylketone, methyl acetate, methyl acrylate, diethyltriamine, N,N-dimethylaminopropylamine, ethylene oxide, tetrahydrofuran and the like. When a water-soluble compound is used as the binder, water may be used as the solvent.

The thickness of the positive electrode is preferably about 0.01 to 20 mm. Excessively large thickness unfavorably leads to deterioration of the conductivity, while excessively small thickness to deterioration of the capacity per unit area. The positive electrode obtained by coating and drying may be pressed, for example by a roller press, for increase of the packing density of the active substance.

(b) Negative Electrode

The negative electrode can be prepared by a known method. For example, it is prepared by mixing a negative electrode active material, a binder, and a conductor, molding the powder mixture obtained into the sheet shape, and bonding the molded sheet obtained onto a current collector, for example a mesh-shaped current collector, of stainless steel or copper under pressure. It can also be prepared by the method using a paste described in the section of (a) positive electrode above. In such a case, it is prepared by kneading and dispersing a negative electrode active material, a conductor, and a binder in an organic solvent into a paste and coating the paste on a current collector.

The negative electrode active material for use may be a known material. For preparation of a high-energy density battery, the potential for intercalation/deintercalation of lithium is preferably closer to the potential for precipitation/solubilization of metal lithium. Typical examples of such a substance are carbon materials such as particulate (scaly, bulky, fibrous, whisker-like, spherical, pulverized particles, and the like), natural or synthetic graphites.

The synthetic graphite is, for example, a graphite obtained by graphitizing mesocarbon microbeads, mesophase pitch powder, isotropic pitch powder or the like. Alternatively, graphite particles having amorphous carbon deposited on the surface can also be used. In particular, natural graphites are preferable, because they are inexpensive, have an oxidation-reduction potential close to that of lithium, and thus, give a high-energy density battery.

In addition, lithium transition metal oxides, lithium transition metal nitrides, transition metal oxides, silicon oxide and the like can also be used as the negative electrode active materials. In particular, $Li_4Ti_5O_{12}$, which has a highly flat potential and shows small volume change by charging and discharging, is preferable.

(c) Nonaqueous Electrolyte

Examples of the nonaqueous electrolytes for use include organic electrolyte solutions, gel electrolytes, polymer solid electrolytes, inorganic solid electrolytes, fused salt and the like.

Example of the organic solvents constituting the organic electrolyte solution for use include cyclic carbonates such as propylene carbonate (PC), ethylene carbonate (EC), and butylene carbonate; open-chain carbonates such as dimethyl carbonate (DMC), diethyl carbonate (DEC), ethyl methyl carbonate, and dipropyl carbonate; lactones such as γ-butyrolactone (GBL) and γ-valerolactone; furans such as tetrahydrofuran and 2-methyltetrahydrofuran; ethers such as diethylether, 1,2-dimethoxyethane, 1,2-diethoxyethane, ethoxymethoxyethane, and dioxane; dimethylsulfoxide, sulfolane, methylsulfolane, acetonitrile, methyl formate, methyl acetate and the like, and these solvents may be use alone or in combination of two or more.

Cyclic carbonates such as PC, EC, and butylene carbonate, which are high-boiling point solvents, are also preferable as the solvents to be mixed with GBL.

Examples of the electrolyte salts constituting the organic electrolyte solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$), and lithium bis(trifluoromethanesulfon)imide ($LiN(CF_3SO_2)_2$), and these compounds may be used alone or in combination of two or more. The salt concentration of the electrolyte solution is preferably 0.5 to 3 mol/l.

(d) Separator

The separator for use may be any known material such as a porous material or a nonwoven fabric. The material for the separator is preferably a material that is not dissolved or swollen in the organic solvent contained in the electrolyte solution. Typical examples thereof include polyester-based polymers, polyolefin-based polymers (for example, polyethylene and polypropylene), ether-based polymers, glass fibers and the like.

(e) Other Components

Various known materials can be used for other constituents of the battery, such as battery container, and the materials for them are not particularly limited.

(f) Production Method for Secondary Battery

A secondary battery has a laminate, for example, consisting of a positive electrode and negative electrode, and a separator held between them. The laminate may have, for example, a strip-like planar shape. For production of a cylindrical or flat battery, the laminate may be wound into a roll.

One or more of the laminates are placed in a battery container. Normally, the positive electrode and the negative electrode are connected to terminals for external conduction of the battery. After placement of the laminate, the battery container is sealed tightly, for protection of the positive electrode, the negative electrode, and the separator by blockage of external air.

In the case of a cylindrical battery, the container is sealed generally, as a cap with a resin packing is placed on the opening of the battery container and calked on the battery container. Alternatively in the case of a square battery, a metal cap, called sealing plate, is placed on the opening and welded thereon. Alternatively to these methods, it may be fixed for example with an adhesive or with a bolt via a gasket. Yet alternatively, it may be sealed tightly with a laminate of a metal foil with a thermoplastic resin bonded thereon. An opening for injection of the electrolyte may be formed during the sealing. If an organic electrolyte solution is used, the organic electrolyte solution is injected through the opening and the opening is then sealed. The gas generated by application of electric current may be removed before sealing.

EXAMPLES

Hereinafter, the present invention will be described more in detail with reference to Examples, but it should be understood that the present invention is not restricted by the following Examples. Analytical-grade reagents produced by Kishida Chemical Co., Ltd. were used in the Examples below, unless specified otherwise.

Example 1 i. Solubilization Step

An iron source, a lithium source, a zirconium source, a silicon source, and a phosphorus source were dissolved in a solvent in that order.

An iron source $Fe(NO_3)_3 \cdot 9H_2O$ was weighed and dissolved completely under agitation in ethanol in a molar amount of 30 times as much as the molar amount of Li. After confirmation of complete solubilization, a lithium source $LiCH_3COO$ was weighed and then, a zirconium source $ZrCl_4$ and a silicon source $Si(OC_2H_5)_4$ were weighed, and they are dissolved in that order, to give a homogeneous solution. Finally, a phosphorus source $H_3PO_4$ (85 wt %) was weighed into the solution, which was agitated until homogeneity. The amount of the lithium source $LiCH_3COO$ was 0.9899 g, and the respective raw materials were weighed at a Li:Fe:Zr:P:Si ratio of 1:0.75:0.25:0.5:0.5 (molar ratio).

ii. Gelation Step

After agitating at room temperature for 1 hour, the homogeneous solution was stored in a constant-temperature oven at 60° C. for 24 hours for gelation. The container was sealed with a cap during the gelation for suppression of evaporation of the solvent.

iii. Drying Step

The cap on the container for the gel obtained in the gelation step was removed and the container was left in a constant-temperature oven at 60° C. overnight for volatilization of the solvent.

iv. Pulverization Step

The gel obtained in the drying step was pulverized in a planetary ball mill. The pulverization in the planetary ball mill was carried out using zirconia balls having a diameter of 10 mmφ at a rotational frequency of 400 rpm for 1 hour.

v. Carbon Source-Mixing Step

A carbon source dissolved in water was added to the pulverized precursor. The carbon source used was sucrose. The amount added was 15 wt %, based on the weight of the precursor. The precursor containing sucrose was dried and then pulverized in a mortar.

vi. Calcination Step

The precursor obtained in the pulverization step was calcined at 550° C. for 12 hours. In the calcination process, the oven was first evacuated to vacuum and nitrogen was allowed to flow in. Under the condition, the precursor was heated at a heating rate of 200° C./h. The cooling rate was the rate of natural cooling in the oven. The sample obtained will be referred to as sample A1.

(Determination of Powder X-Ray Diffraction Pattern)

Figure 2:
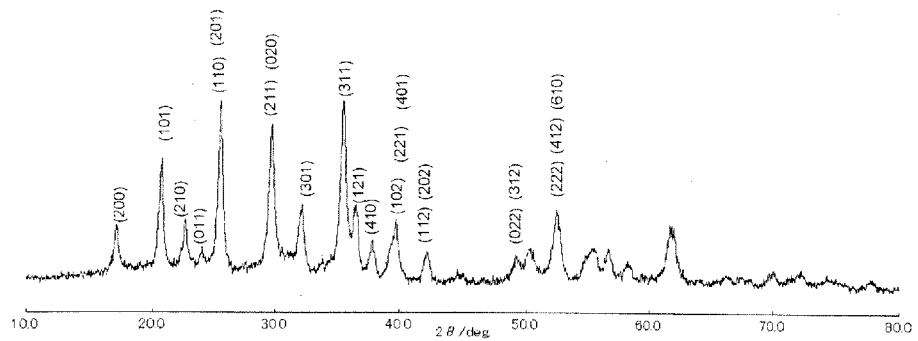
FIG. 2 is the powder X-ray diffraction pattern of the positive electrode active material of Example 1.

The powder X-ray diffraction pattern of the composite oxide obtained was determined by using a powder X-ray diffraction device MiniFlex II produced by Rigaku Co., Ltd. Results are shown in FIG. 2. The X-ray diffraction pattern showed that the sample had a crystalline phase in the olivine-type structure and that there was no peak corresponding to the impurities such as $Fe_2O_3$ and $ZrO_2$.

Example 2

A lithium-containing composite oxide was prepared in a manner similar to Example 1, except that the zirconium source, the iron source, the silicon source, the lithium source, and the phosphorus source were weighed at a Li:Fe:Zr:P:Si ratio of 1:0.85:0.15:0.7:0.3 (molar ratio) in the solubilization step. The sample obtained will be referred to as sample A2.

(Results)

The powder X-ray diffraction pattern of the composite oxide obtained was determined similarly to Example 1. An X-ray diffraction pattern similar to that in Example 1 was obtained, indicating that the sample contained a crystalline phase in the olivine-type structure formed. It was also found that there was no peak corresponding to the impurities such as $ZrO_2$.

Example 3

A lithium-containing composite oxide was prepared in a manner similar to Example 1, except that the zirconium source, the iron source, the silicon source, the lithium source, and the phosphorus source were weighed at a Li:Fe:Zr:P:Si ratio of 1:0.9:0.1:0.8:0.2 (molar ratio) in the solubilization step. The sample obtained will be referred to as sample A3.

(Results)

The powder X-ray diffraction pattern of the composite oxide obtained was determined similarly to Example 1. An X-ray diffraction pattern similar to that in Example 1 was obtained, indicating that the sample contained a crystalline phase in the olivine-type structure formed. It was also found that there was no peak corresponding to the impurities such as $ZrO_2$.

Example 4

A lithium-containing composite oxide was prepared in a manner similar to Example 1, except that the zirconium source, the iron source, the silicon source, the lithium source, and the phosphorus source were weighed at a Li:Fe:Zr:P:Si ratio of 1:0.925:0.075:0.85:0.15 (molar ratio) in the solubilization step. The sample obtained will be referred to as sample A4.

(Results)

The powder X-ray diffraction pattern of the composite oxide obtained was determined similarly to Example 1. An X-ray diffraction pattern similar to that in Example 1 was obtained, indicating that the sample contained a crystalline phase in the olivine-type structure formed. It was also found that there was no peak corresponding to the impurities such as $ZrO_2$.

Example 5

A lithium-containing composite oxide was prepared in a manner similar to Example 1, except that the zirconium source, the iron source, the silicon source, the lithium source, and the phosphorus source were weighed at a Li:Fe:Zr:P:Si ratio of 1:0.95:0.05:0.9:0.1 (molar ratio) in the solubilization step. The sample obtained will be referred to as sample A5.

(Results)

The powder X-ray diffraction pattern of the composite oxide obtained was determined similarly to Example 1. An X-ray diffraction pattern similar to that in Example 1 was obtained, indicating that the sample contained a crystalline phase in the olivine-type structure formed. It was also found that there was no peak corresponding to the impurities such as $ZrO_2$.

Comparative Example 1

A lithium-containing composite oxide was prepared in a manner similar to Example 1, except that the zirconium source, the iron source, the silicon source, the lithium source, and the phosphorus source were weighed at a Li:Fe:Zr:P:Si ratio of 1:0.98:0.02:0.96:0.04 (molar ratio) in the solubilization step. The sample obtained will be referred to as sample B1.

(Results)

The powder X-ray diffraction pattern of the composite oxide obtained was determined similarly to Example 1. An X-ray diffraction pattern similar to that in Example 1 was obtained, indicating that the sample contained a crystalline phase in the olivine-type structure formed. It was also found that there was no peak corresponding to the impurities such as $ZrO_2$.

Comparative Example 2

A lithium-containing composite oxide was prepared in a manner similar to Example 1, except that the zirconium source, the iron source, the silicon source, the lithium source, and the phosphorus source were weighed at a Li:Fe:Zr:P:Si ratio of 1:1:0:1:0 (molar ratio) in the solubilization step. The sample obtained will be referred to as sample B2.

(Results)

The powder X-ray diffraction pattern of the composite oxide obtained was determined similarly to Example 1. An X-ray diffraction pattern similar to that in Example 1 was obtained, indicating that the sample contained a crystalline phase in the olivine-type structure formed. It was also found that there was no peak corresponding to the impurities such as $Fe_2O_3$.

(Evaluation of Properties as Half Cell: Determination of Positive Electrode Capacity and Area Ratio)

The positive electrode capacity and the ratio α of the areas of be planes of each sample were determined by the following methods.

Approximately 1 g of the positive electrode active material obtained was weighed and pulverized in an agate mortar. Acetylene black (trade name: "DENKA BLACK", produced by Denki Kagaku Kogyo Kabushiki Kaisha), which was used as conductive substance, in an amount of about 10 wt % with respect to the positive electrode active material and a polyvinylidene fluoride resin powder in an amount of about 10 wt % with respect to the positive electrode active material, which was used as binder, were mixed with it. The mixture was dispersed in a solvent such as N-methyl-2-pyrrolidone into the slurry state, and the slurry was coated on both faces of an aluminum foil having a thickness of 20 μm by the doctor blade method. The coating amount was adjusted to about 5 mg/cm². The electrode was dried and then pressed, to give a positive electrode.

Approximately 30 ml of an electrolyte containing 1 mol/l of $LiPF_6$ dissolved in ethylene carbonate and diethyl carbonate at a ratio of 1:2 was place in a 50-ml beaker, and a beaker cell consisting of a positive electrode of 2 cm×2 cm, a reference electrode of metal lithium, and a counter electrode of metal lithium was prepared.

The cell prepared in this way was charged first at 25° C. The charge current was 0.1 mA and the charging was terminated when the potential of the cell reached 4 V. The capacity then was called the first-time charge capacity. When the cell was, after the charging, discharged at 0.1 mA and the potential of the cell reached 2.0 V, the discharging was terminated, and the capacity then was designated as the first-time discharge capacity of the cell. These first-time discharge capacities are shown in Table 1.

TABLE 1

|  | Sample name | First-time discharge capacity (mAh/g) |
| --- | --- | --- |
| Example 1 | A1 | 105.1 |
| Example 2 | A2 | 108.0 |
| Example 3 | A3 | 124.9 |
| Example 4 | A4 | 111.6 |
| Example 5 | A5 | 120.4 |
| Comparative Example 1 | B1 | 151.8 |
| Comparative Example 2 | B2 | 155.8 |

Figure 3:
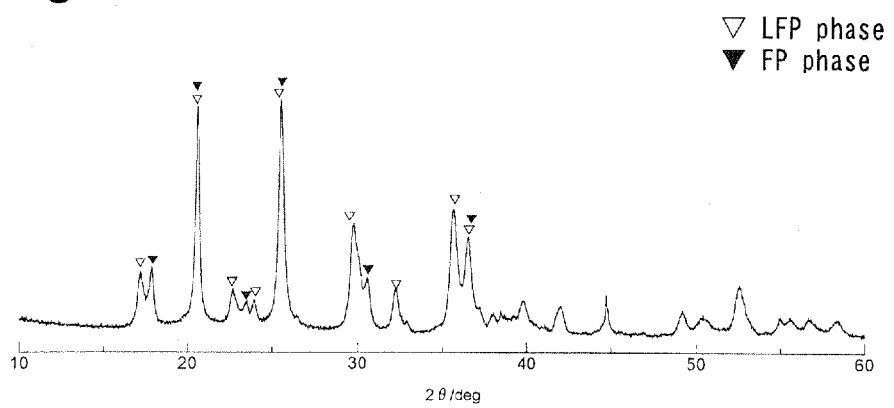
FIG. 3 is the powder X-ray diffraction pattern of the positive electrode active material of Comparative Example 1.

When the cell was then charged to half of the first-time discharge capacity, the charging was terminated. The positive electrode in the state was withdrawn and subjected to powder X-ray diffraction analysis using CuKα X-ray. The X-ray diffraction pattern of the sample A1 is shown in FIG. 3. In contrast to the X-ray diffraction pattern shown in FIG. 2, the X-ray diffraction pattern showed that the sample contained two phases, a crystalline phase before lithium deintercalation and a crystalline phase after lithium deintercalation. The lattice constants (a, b, and c axes) of the two phases were determined from the X-ray diffraction pattern.

The lattice constants of the crystalline phase before deintercalation of lithium to the crystalline phase after lithium deintercalation and the area ratio α are shown in Table 2.

TABLE 2

| Sample name | Before lithium deintercalation | | | | After lithium deintercalation | | | | Area ratio α |
| --- | --- | --- | --- | --- | --- | --- | --- | --- | --- |
|  | Lattice constant (Å) | | | Area ($Å^2$) | Lattice constant (Å) | | | Area ($Å'^2$) |  |
|  | a | b | c |  | a | b | c |  |  |
| A1 | 10.321 | 5.974 | 4.766 | 28.472 | 10.168 | 6.000 | 4.787 | 28.722 | 1.009 |
| A2 | 10.315 | 5.972 | 4.763 | 28.445 | 10.127 | 5.984 | 4.789 | 28.657 | 1.007 |
| A3 | 10.288 | 5.955 | 4.741 | 28.233 | 10.125 | 5.940 | 4.732 | 28.108 | 0.996 |
| A4 | 10.316 | 5.972 | 4.764 | 28.451 | 10.124 | 5.942 | 4.760 | 28.284 | 0.994 |
| A5 | 10.298 | 5.965 | 4.754 | 28.361 | 10.002 | 5.927 | 4.747 | 28.139 | 0.992 |
| B1 | 10.299 | 5.957 | 4.750 | 28.296 | 9.950 | 5.881 | 4.738 | 27.864 | 0.985 |
| B2 | 10.280 | 5.959 | 4.744 | 28.271 | 9.880 | 5.852 | 4.735 | 27.710 | 0.980 |

(Evaluation of Properties of Secondary Battery)

A secondary battery was prepared using the positive electrode active material obtained by the following method.

Example 6

The sample A1 was pulverized in an agate mortar. Approximately 80 wt % of the pulverized product obtained, approximately 10 wt % of acetylene black (DENKA BLACK produced by Denki Kagaku Kogyo Kabushiki Kaisha) as conductor, and approximately 10 wt % of a Teflon (registered trade name) resin powder (Kureha KF Polymer produced by Kureha Chemical Industry Co., Ltd.) as binder were mixed with each other.

The mixture was dissolved/dispersed in N-methyl-2-pyrrolidone (produced by Kishida Chemical) into a slurry state and the slurry was coated on both faces of an aluminum foil having a thickness of 20 μm by the doctor blade method. The coating amount was adjusted to about 5 mg/cm². After the coated film was dried, it was cut to a piece with an electrode-coated surface of 2 cm×2 cm, which was pressed, to give a positive electrode (entire thickness: 30 μm).

A natural graphite powder (MAG, a material for negative electrode of lithium ion battery, produced by Hitachi Chemical Co., Ltd.) was used as the negative electrode active material. Approximately 10 wt % of a Teflon resin powder as binder was mixed with the negative electrode active material. The mixture was dissolved/dispersed in N-methyl-2-pyrrolidone into a slurry state and the slurry was coated on both faces of a copper foil having a thickness of 20 μm. After drying, the film was pressed, to give a negative electrode (entire thickness: 30 μm).

The positive electrode and the negative electrode prepared as described above were cut to pieces in the size of 30 mm×30 mm, and an aluminum tab having a width of 3 mm and a length of 50 mm was welded to the positive electrode and a copper tab having a width of 3 mm and a length of 50 mm to the negative electrode as the current-introducing terminals of the secondary battery, to give a positive electrode and a negative electrode.

A separator of a polyolefin resin microporous film (Hipore, produced by Asahi Kasei Corporation) was held between these positive electrode and negative electrode. The laminate obtained was held between two laminates of a metal foil bonded to a thermoplastic resin, which is used as battery package, and then, the periphery, except the region for the opening for injection of electrolyte, was thermally fused to seal the battery package.

An electrolyte containing 1 mol/l of $LiPF_6$ dissolved in 50 vol % of ethylene carbonate and 50 vol % of diethyl carbonate was fed into the battery package through the opening, impregnating the laminate with the electrolyte.

Figure 4:
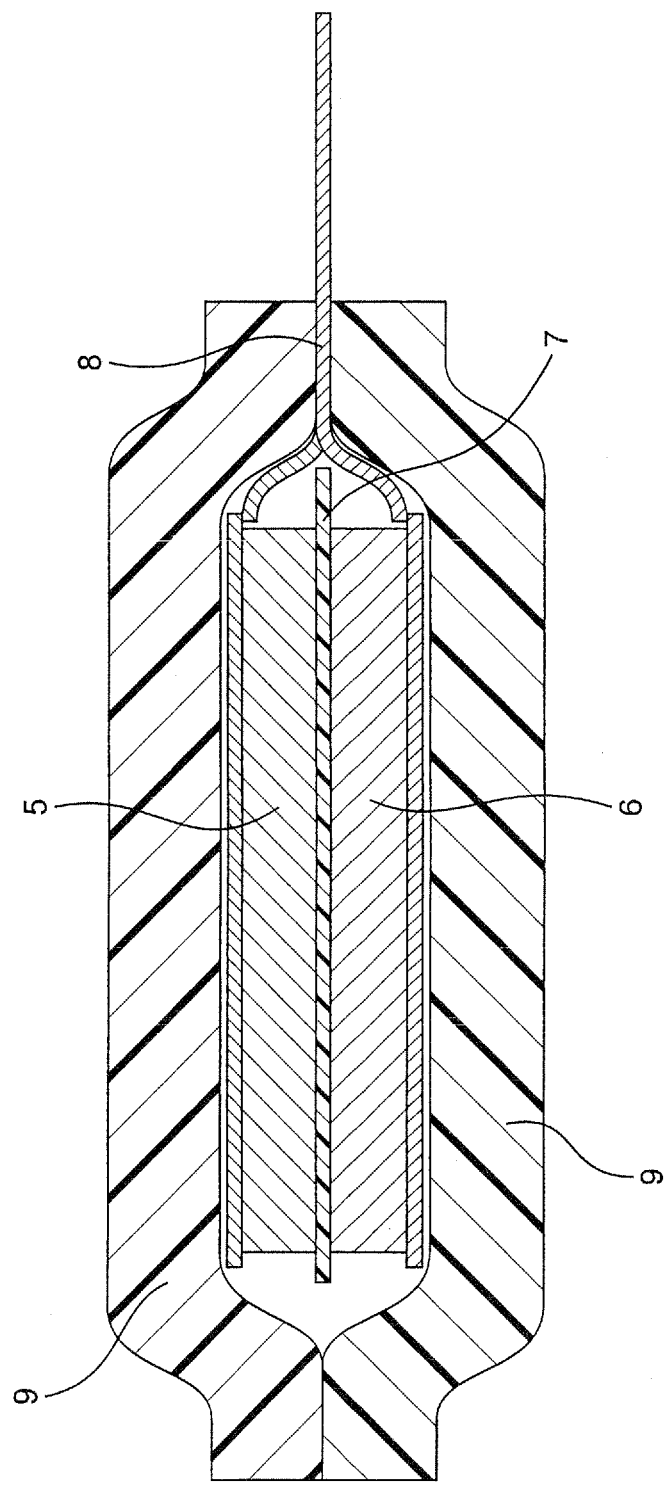
FIG. 4 is a schematic vertical crosssectional view illustrating the structure of the nonaqueous-electrolyte secondary battery according to the present invention.

After the impregnation, the opening was sealed, to give a secondary battery shown in FIG. 4. In FIG. 4, 5 represents a positive electrode; 6 represents a negative electrode; 7 represents a separator; 8 represents positive electrode and negative electrode tabs; and 9 represents a laminate.

Examples 7 and 8

A secondary battery was prepared in a manner similar to Example 6, except that the sample A2 or A3 was used, replacing the sample A1, as the positive electrode active substance and lithium titanate ($Li_4Ti_5O_{12}$) was used, replacing the natural graphite powder.

Examples 9 and 10

A secondary battery was prepared in a manner similar to Example 6, except that the sample A4 or A5 was used, replacing the sample A1, as the positive electrode active material and lithium titanate ($Li_4Ti_5O_{12}$) was used, replacing the natural graphite powder.

Comparative Examples 3 and 4

A secondary battery was prepared in a manner similar to Example 1, except that the sample B1 or B2 was used, replacing the sample A1, as the positive electrode active material.

The battery thus prepared was charged and discharged in an environment of 25° C. The charge current was regulated to 0.3 mA and when the potential of the battery reached 4 V, the charging was terminated. After the charging, it was discharged at 0.3 mA and, when the potential of the battery reached 2.0 V, the discharging was terminated. Further, charging and discharging were repeated at a current to 0.3 mA and the discharge capacity at the 100th cycle was determined. The capacity retention rate was calculated in accordance with the Formula below. Results are shown in Table 3.

Capacity retention rate=(100th discharge capacity/1st discharge capacity)×100

TABLE 3

| Sample name | First-time discharge capacity (mAh/g) | 100th discharge capacity (mAh/g) | Capacity retention rate (%) |
|---|---|---|---|
| Example 6 | A1 | 98.4 | 93.8 | 95.3 |
| Example 7 | A2 | 101.9 | 98.1 | 96.3 |
| Example 8 | A3 | 116.9 | 110.2 | 94.3 |
| Example 9 | A4 | 103.9 | 101.8 | 98 |

TABLE 3-continued

| Sample name | First-time discharge capacity (mAh/g) | 100th discharge capacity (mAh/g) | Capacity retention rate (%) |
|---|---|---|---|
| Example 10 | A5 | 113.4 | 110.9 | 97.8 |
| Comparative Example 3 | B1 | 140.8 | 104.9 | 74.5 |
| Comparative Example 4 | B2 | 147.7 | 123.4 | 83.5 |

As shown in Table 3, the secondary batteries of Examples 6 to 10 had high capacity retention rate, compared to those of Comparative Examples 3 and 4 and the capacity retention rates were 90% or more when the negative electrode active material is a natural graphite and 97% or more when it was $Li_4Ti_5O_{12}$.

What is claimed is:

1. A positive electrode active material for nonaqueous-electrolyte secondary batteries, comprising a lithium-containing composite oxide represented by the following General Formula (1):

$$Li_zFe_{1-x}M_xP_{1-y}Si_yO_4 \quad (1)$$

(wherein M is at least one metal element selected from Zr, Sn, Y, and Al, 0.05<x<1, and 0.05<y<1), characterized in that:

the lithium-containing composite oxide is in the single phase of the lithium-containing composite oxide represented by General Formula (1) when 1≥z>0.75 or when 0.25>z>0;

a charge and discharge reaction progresses in a state where the positive electrode active material has two phases of the lithium-containing composite oxides represented by the following General Formulae (2) and (3) when 0.75>z>0.25:

$$Li_aFe_{1-x}M_xP_{1-y}Si_yO_4 \quad (2)$$

(wherein 0.75≤a≤1.00, 0.05<x<1, and 0.05<y<1); and $$Li_bFe_{1-x}M_xP_{1-y}Si_yO_4 \quad (3)$$

(wherein 0≤b≤0.25, 0.05<x<1, b+x<1, and 0.05<y<1), and when the product of the lengths of the b and c axes of the unit cell of the lithium-containing composite oxide of General Formula (2) is designated as bc1 and the product of the lengths of the b and c axes of the unit cell of the lithium-containing composite oxide of General Formula (3) as bc2, α, which is defined by equation α=(bc2)/(bc1), is 0.99<α<1.01 in a state where the positive electrode active material has two phases.

2. The positive electrode active material for nonaqueous-electrolyte secondary batteries according to claim 1, wherein the valency of M is tetravalent.

3. The positive electrode active material for nonaqueous-electrolyte secondary batteries according to claim 1, wherein M is Zr.

4. The positive electrode active material for nonaqueous-electrolyte secondary batteries according to claim 1, wherein at least part of the surface of the positive electrode active material is covered with carbon.

5. A nonaqueous-electrolyte secondary battery positive electrode, comprising the positive electrode active material for nonaqueous-electrolyte secondary batteries according to claim 1, a conductor, and a binder.

6. A nonaqueous-electrolyte secondary battery, comprising a positive electrode containing the positive electrode active material for nonaqueous-electrolyte secondary batteries according to claim 1, a negative electrode, an electrolyte, and a separator.

* * * * *